(12) United States Patent
Noland

(10) Patent No.: US 6,991,409 B2
(45) Date of Patent: Jan. 31, 2006

(54) ROTARY CUTTING TOOL

(75) Inventor: Dennis L. Noland, Brockway, PA (US)

(73) Assignee: Niagara Cutter, Amherst, NY (US)

( * ) Notice: Subject to any disclaimer, the term of this patent is extended or adjusted under 35 U.S.C. 154(b) by 395 days.

(21) Appl. No.: 10/327,521

(22) Filed: Dec. 24, 2002

(65) Prior Publication Data
US 2004/0120777 A1 Jun. 24, 2004

(51) Int. Cl.
B23C 5/10 (2006.01)

(52) U.S. Cl. .............................. 407/63; 407/59; 407/60; 407/61

(58) Field of Classification Search .................. 407/63, 407/30, 56, 57, 59, 61, 118
See application file for complete search history.

(56) References Cited

U.S. PATENT DOCUMENTS

| | | | |
|---|---|---|---|
| 4,963,059 A | | 10/1990 | Hiyama |
| 5,272,940 A | * | 12/1993 | Diskin ........................ 76/108.6 |
| 5,297,456 A | * | 3/1994 | Nishimura ................. 76/108.6 |
| 5,799,399 A | * | 9/1998 | Schultz ........................ 407/54 |
| 5,810,517 A | | 9/1998 | Bostic |
| 5,984,592 A | | 11/1999 | Harper et al. |
| 6,065,905 A | | 5/2000 | Kinton |
| 6,132,146 A | | 10/2000 | Satran et al. |
| 6,152,657 A | | 11/2000 | Packer et al. |
| 6,164,876 A | * | 12/2000 | Cordovano .................. 407/59 |
| 6,382,888 B2 | | 5/2002 | Cook |
| 2002/0090273 A1 | | 7/2002 | Serwa |

FOREIGN PATENT DOCUMENTS

JP 07040118 A * 2/1995

OTHER PUBLICATIONS

Printed Brochure by SGS Tool Company, Patented Z Carb Revolutionizes Milling (4 pages).
Printed Brochure by Hanita/Kennametal Industrial Products Group, Varimill, Cat. No. 03/02 (4 pages).

* cited by examiner

Primary Examiner—Willmon Fridie, Jr.
(74) Attorney, Agent, or Firm—Hiscock & Barclay, LLP

(57) ABSTRACT

A rotary cutting tool that includes an elongated tool body, rotatable along a longitudinal axis of rotation is disclosed. It has a fluted cutting end on one end and a shank end on the opposite end of the tool body. The fluted cutting end includes a nose, a periphery and an end surface that extends from the nose to the periphery. A plurality of axial flutes extends from the end surface to the fluted cutting end and combines with a plurality of cutting edges. The cutting edges are unequally spaced along the circumference of the end surface lying in a plane perpendicular to the longitudinal axis of rotation. In addition, all cutting edges are of a different helix from one another and the cutting edge geometries vary from one another to create a different sound pattern. This reduces resonant harmonic vibrations.

69 Claims, 9 Drawing Sheets

ROTARY CUTTING TOOL

STATEMENT RE: FEDERALLY SPONSORED RESEARCH/DEVELOPMENT

Not applicable.

BACKGROUND OF THE INVENTION

1. Field of the Invention

The invention relates to rotary cutting tools and end mills, and more particularly to helically fluted end mills having a plurality of cutting edges unequally spaced with respect to the longitudinal axis of rotation with varying cutting edge geometries.

2. Prior Art

Rotary cutting tools typically employ multiple flutes spaced circumferencially around the tool body and running along the cutting length of the tool. The number of flutes may vary and can run either parallel to the rotational axis, or more commonly, in a helix that is formed as the tool is advanced into a workpiece. Fluted rotary cutting tools have been used for years to perform intricate cutting and sophisticated machining and finishing operations.

Typically, the cutting end includes one or more peripheral cutting edges that are equally spaced with respect to each other having the same helix angle and thus forming a symmetry with respect to the axis of rotation. Moreover, the entire portion of each cutting edge is curved so that the cutting edge lies on the surface of a circumscribing cylinder defined by the rotation of the cutting edge about the rotational axis of the tool body.

Such conventional rotary cutting tools perform adequately at slow rotational speeds. However, at high cutting speeds that are unquestionably preferred, considerable machining difficulty is experienced including forced work stoppage. Such limitations and difficulties stem from the unfortunate development of vibratory forces, more particularly resonant vibration, at higher cutting speeds when the cutting tool begins to chatter resulting in a lack of control over machining and finishing. This can eventually lead to an unsatisfactory work product. In addition, the resonant vibration can reduce the tool life.

Chatter and resonant vibration are problems encountered generally at high speed machining with conventional rotary cutting tools. Thus far, the dynamic stability of the rotary cutting tool has been a limiting factor even though the newer generation of cutting tools generally provide a better cutting performance than their predecessors since many of them now contain a specific coating and are made of a stronger metal or alloy. For a conventional rotary cutting tool, there indeed exists a critical set of rotational speed and depth of cut at which the tool becomes unstable and starts to chatter with sufficient amplitude. This forces an unplanned and undesirable compromise involving the quality of machining, or the life of the tool, or both.

Numerous designs have been suggested in search of improved cutting speeds, improved surface finishing and improved tool longevity while keeping the vibration and the resulting chatter low. These designs have focused on the geometry of the cutting edges, formation of multiple flutes and their configuration in connection with the support structure. The goals have included not only the tool performance along with speed and smoothness of the dampening or chattering, but also prolonging of the tool life.

As indicated earlier, conventional designs for rotary cutting tools include multiple flutes spaced circumferencially around the tool body. They include multiple adjacent cutting blades or cutting edges, each of which is equally spaced about the circumference of the tool body as well. In conventional rotary cutting tools, the cutting edges are designed to be equally spaced in order to allow even loading on the cutting blades. For these reasons, the flutes of conventional rotary cutting tools are of the same size which allows equal load distribution among the flutes. This, in turn, makes a conventionally designed rotary cutting tool strength-limited because of the resonant vibrations caused by such equalizing efforts. As used herein and in the appended claims, the term "circumferencial index" is employed here to indicate angular position about the rotational axis of the tool and it does not suggest or teach a particular space of the tool, or any particular cross-section thereof.

The prior art includes numerous rotary cutting tool designs and improvements. For example, in U.S. Pat. No. 4,963,059 the invention relates to a rotating cutting tool having a plurality of helical peripheral cutting edges with unequal helix angles formed on a circumferencial surface of a tool body. In this invention, at least one of the peripheral cutting edges has a helix angle different from helix angles of the other peripheral cutting edges, but two peripheral cutting edges of such parts of cutting edges share the same helix angles and are symmetrical with respect to the axis of the body. Additionally, the cutting edges are equally spaced circumferencially on the body in at least one plane perpendicular to the axis of rotation of the body.

U.S. Pat. No. 5,810,517 discloses three complexly configured, equally spaced cutting edges. In the first embodiment, the cutting edges are defined by the intersections of right circular cylinders, offset from the axis of the countersink, with the frustum of a cone. In the second embodiment, the cutter body includes a circumferencially, concavely radiused edge defining a quarter section of a torus disposed coaxially about the cutter axis and the cutting edges are defined by the intersection of the flutes. The third embodiment is similar to the first embodiment, except the oblique conical surfaces converge to a vertex. In all three embodiments, it is further disclosed, the cutting edge is a complex arcuate or crescent-shaped curve.

U.S. Pat. No. 5,984,592 shows a rotary cutting tool consisting of a plurality of cutting inserts and containing at least one side insert with a cutting edge projected radically from the peripheral region of the tool body and at least one end insert projected from a forward axial end region of the tool body. These two inserts, it is disclosed, are located in positions that are angularly spaced about a central rotary axis of the tool body and describe cutting envelopes that intersect or overlap in the rotation of the body about said axis. It further teaches that each side insert is secured by clamping screws substantially radially into the tool body and at least two of each said inserts are preferably symmetrically spaced about the central cutting axis of the tool body and in corresponding axial and radial positions.

U.S. Pat. No. 6,065,905 discloses a rotary cutting tool that includes a coating on its radial relief surfaces in order to enhance damping of vibratory motion of the tool at speeds which permit the relief surfaces to rub on the workpiece. It further teaches that in a preferred embodiment, the tool is made of tungsten carbide, steel, or cermet.

U.S. Pat. No. 6,132,146 teaches a rotary cutting tool with a longitudinal axis of rotation, having a cutting head formed with at least two chip evacuation flutes and at least two body portions bearing cutting inserts there between. It also discloses that the operative cutting edge of the second outer cutting insert is substantially shorter than the operative cutting edge of the first outer cutting insert and their outermost ends are substantially equidistant from the axis of rotation.

U.S. Pat. No. 6,152,657 discloses a center cutting end mill wherein flutes extend from the cutting end to the base end and the cutting end having one or more spiral groves and flutes in the walls of a mill body. It also teaches us positioning of a groove adjacent to a leading edge of each flute where each groove is filled with polycrystalline diamond-like material situated in sites within such groove. It also discloses that the diamond-like material is exposed to form a cutting edge along the leading edge of the material extending sufficiently close to the center of the end mill for cutting the workpiece all the way to the center of the end mill.

U.S. Pat. No. 6,382,888 teaches us a vibration dampened spindle and tool holder assembly for a rotary cutting machine, such tool holder having an interfacing ledge with a top surface for abutment with a distal spindle surface and a continuous channel disposed in a proximal portion of the top surface. It further discloses that a resilient dampening member, preferably fabricated from a natural or synthetic rubber composition and having a rectangular or a circular cross-sectional configuration, resides in the channel for compressed abutment with the spindle surface.

U.S. patent application Ser. No. 20020090273 discloses a roughing and finishing rotary tool apparatus and method where said tool preferably has a roughing flute adjacent to each roughing blade and a finishing flute adjacent to each finishing blade. It further teaches that in highly preferred embodiments, the finishing flutes are smaller than roughing flutes, and preferably, each finishing flute is located closer to the preceding roughing flute so that flutes are preferably unequally spaced. In some highly preferred embodiments, according to its teaching, the blades are unequally circumferencially spaced and are immediately behind the flutes. It further discloses that in the most preferred embodiment, all of the finishing blades extend radially farther than all of the roughing blades.

A printed publication by SGS Tool Company discloses a patented Z-Carb milling which reportedly incorporates the design revealed in U.S. Pat. No. 4,963,059, described earlier.

Another printed publication, in the form of a sales literature for VariMill and reportedly based on an invention by Hanita for which patent is pending, discloses a controlled relief in a tool body with helical flutes. The disclosure teaches us that while the helix angles are all the same, the indexes are different. This reportedly makes one set of cutting edges indexed unequally from that of another set of cutting edges.

The foregoing review of patents, published patent applications and miscellaneous printed publications generally reveals diverse designs and cutting configurations of rotary cutting tools and end mills, each attempting to provide an improved performance. The review confirms that additional improvements are not distant goals, but may be achievable now.

The problems associated with resonant vibrations that result in shock resistance have not been solved by the prior art. Such vibrations along with heat and wear resistances are detrimental to a long tool life. While new coating technologies have addressed successfully the issues of heat and wear resistances by introducing a battery of metal, ceramic and chemical substrates, the concern involving resonant vibrations or shock resistance has not been addressed by the prior art. The present invention solves such problems and offers one or more additional improvements over the prior art.

SUMMARY OF THE INVENTION

The following description of the present invention applies to any rotary cutting tool, such as end mills, drill bits, reamers, milling cutters, and the like.

Resonant vibrations result in shock resistance. Such vibrations along with heat and wear resistances are detrimental to a long tool life. As indicated earlier, new coating technologies have addressed successfully the issues of heat and wear resistances by introducing a battery of metal, ceramic and chemical substrates. However, the concern involving resonant vibration or shock resistance is yet to be addressed satisfactorily.

It is an object of the present invention to provide an economically viable, improved rotary cutting tool that provides an excellent cutting operation with smooth surfaces. A principal objective of the present invention also is to provide vibration-free operability of a rotary cutting tool. Therefore, the core focus of the present invention is to provide a rotary cutting tool that significantly reduces, if not eliminates, the resonant vibration.

In order to achieve these objectives, the present invention studied the mechanism in material cutting in conjunction with the principles of a stabilizing technology. Based on such studies, the inventor conceived the present invention to reduce and perhaps eliminate resonant vibration by making the rotary cutting tool unbalanced and therefore unsynchronized with respect to the cutting forces.

According to the present invention, a rotary cutter can reduce the resonant vibration generated by each flute by varying the circumferencial index of each flute whereby the flutes become asymmetric and unequal with each other. Additional stability is achieved by taking an unequal circumferencial index of the configuration and adding a second variable of an unequal helix angle to it. Even further stability is achieved by taking an unequal circumferencial index of the configuration, an unequal helix angle of the configuration, and adding a third variable of an unequal cutting edge rake angle to it. Further still, additional stability is achieved by taking an unequal circumferencial index of the configuration, an unequal helix angle of the configuration, an unequal cutting edge rake angle of the configuration, and adding a forth variable of an unequal cutting edge relief angle to it. Thus, the first embodiment of the present invention may generally be characterized as a rotary cutting tool embracing an unequal circumferencial index, and unequal flute helix, an unequal cutting edge rake, and an unequal cutting edge relief wherein all aspects, in regards to the angles to each element, are differentiated from one another by at least one half or more of a degree. The second embodiment may generally be characterized as a cutting tool that provides a superior stability by making all aspects of the cutting tool variable. In this embodiment, every cutting edge that has a helix, a rake, and a relief varies for the entire length of the cutting edge. The third embodiment may be generally characterized as a cutting tool whose end or side cutting edges have an unequal cutting edge rake and an unequal cutting edge relief differentiated from one another by at least one half or more of a degree. This additional configuration over the first or second embodiment allows greater stability during plunge or side cutting. The fourth embodiment may generally be characterized as a cutting tool whose end or side cutting edges are of a contoured shape and having an unequal cutting edge rake and an unequal cutting edge relief differentiated from one another by at least one-half or more degrees. This improvisation over the first or second embodiment allows greater stability during plunge, ramping, or contour cutting.

The present invention offers one or more of these desired results. The rotary cutting tool, according to the present invention, is a tool that is much more stable than ever before while offering an excellent cutting performance, a good surface finish and a greater cutting speed. At the same time, it leads to less chattering and a shorter downtime, all leading to a long tool life. Accordingly, it is a primary object of the present invention is to greatly reduce, if not completely eliminate, all resonant vibrations that may typically generate at higher cutting speeds.

Additional objects and advantages of the present invention will be apparent by studying the appended drawings and the detailed description of the inventions as provided below.

BRIEF DESCRIPTION OF THE DRAWINGS

For a better understanding and to appreciate various improvements and advantages of the present invention over the prior art, the invention will be described by way of example only, with reference to the accompanying drawings that show enlarged views at various arbitrary scales.

DETAILED DESCRIPTION OF THE INVENTION

Figure 1:
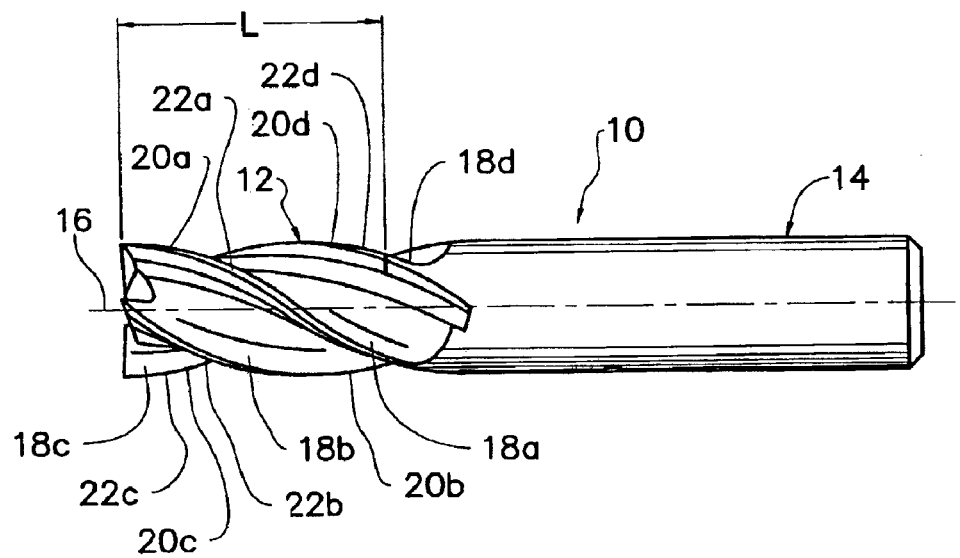
FIG. 1 is a side view of the rotary cutting tool in accordance with the present invention.

Throughout the specification including claims, numerous technical terms have been used which convey special meanings and therefore may not be defined in a dictionary of common usage. Therefore, these terms are defined below.

The term "circumferencial index" means the rotational distance between adjacent cutting edges measured in degrees around the circumference.

The term "cutting edge" means the intersection of a rake face surface and a relief surface.

The term "flute" means the chip space between the back of one tooth and the face of the following tooth and of uniform configuration.

The term "helix" means a curve traced on a cylinder by the rotation of a point crossing its right sections at a constant oblique angle.

The term "helix angle" means the oblique angle measured at the plane, which contains the axis of the cutter.

The term "rake" means the angularity of the face of the cutting edge.

The term "axial rake" means the angle between a plane normal to the axis at the cutting edge and the surface of the cutting face.

The term "negative rake" means a tooth face in rotation whose cutting edge follows or trails the surface of the cutting face.

The term "positive rake" means a tooth face in rotation whose cutting edge leads or is in front of the surface of the cutting face.

The term "radial rake" means the angle between a plane normal to the radial at the cutting edge and the surface of the cutting face.

The term "relief" means the result of removing material behind and adjacent to the cutting edge.

The term "axial relief" means the angle between a plane normal to the axis at the cutting edge and the relieved surface.

The term "radial relief" means the angle between a plane normal to the radial at the cutting edge and the relieved surface.

Other terms as used here convey their customary and trade meanings unless indicated otherwise.

The accompanying drawings incorporated herein form a part of the specification, illustrate the main features of the present invention, and together with the description provided herein serve to explain the principles of the present invention. The rotary cutting tool illustrated in these drawings is an end mill. As a result, those who are familiar with the art will be able to appreciate and distinguish the differences between this and the other kinds of tool.

The present invention will now be described herein. It is illustrated in FIGS. 1 through 23 as presented with reference to an end mill (indicated generally at 10). However, this invention can be embodied in any type of rotary cutting tool having one or more cutting edges. The tool 10 has a cutting body 12 with an axis of rotation 16. The cutting body 12 can be of any length to width ratio required for machining of a given part. For the purpose of this example the tool 10 has a shank 14 opposite the cutting body 12 for attachment to a driving device in any conventional manner. There are other manners of attaching the tool 10 to other driving devices that do not require the tool 10 to have a shank 14, each of which falls within the scope and spirit of the present invention.

FIGS. 1 through 7 show a four-flute end mill in accordance with the first embodiment of the present invention.

FIG. 1 shows an end mill 10 that includes: a cutting body 12; a shank 14; four radial cutting edges (20a, 20b, 20c, and 20d); four radial rake faces (18a, 18b, 18c, and 18d); four radial relief faces (22a, 22b, 22c, and 22d); a cutting length L; and a rotational axis 16. The cutting body 12 may be made of high speed steel, cemented carbide, cermet, or any other material or combination of materials that can be used to make rotary cutting tools.

Figure 2:
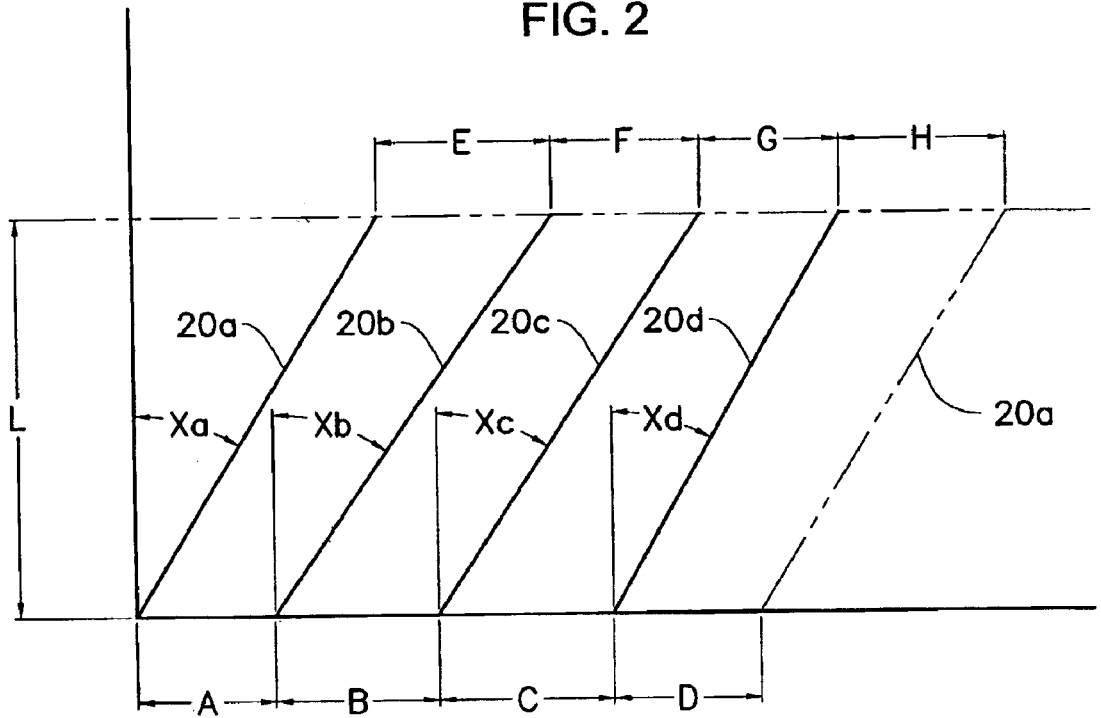
FIG. 2 is a schematic development view of the cutting tool of FIG. 1, showing the disposition of peripheral cutting edges.

FIG. 2 shows the schematic view of the circumference of the cutting body 12. In this schematic view it is shown across the cutting length L that: the radial cutting edge 20a has a helix angle of Xa, a circumferencial index difference of angle A in relation to radial cutting edge 20b at the front of the cutting body 12 and a circumferencial index difference of angle E in relation to radial cutting edge 20b at the back of the cutting body 12; the radial cutting edge 20b has a helix angle of Xb, a circumferencial index difference of angle B in relation to radial cutting edge 20c at the front of the cutting body 12 and a circumferencial index difference of angle F in relation to radial cutting edge 20c at the back of the cutting body 12; the radial cutting edge 20c has a helix angle of Xc, a circumferencial index difference of angle C in relation to radial cutting edge 20d at the front of the cutting body 12 and a circumferencial index difference of angle G in relation to radial cutting edge 20d at the back of the cutting body 12; the radial cutting edge 20d has a helix angle of Xd, a circumferencial index difference of angle D in relation to radial cutting edge 20a at the front of the cutting body 12 and a circumferencial index difference of angle H in relation to radial cutting edge 20a at the back of the cutting body 12. This view impart, shows two of the four main features of the first embodiment of this invention, these being the variation of circumferencial indexes (A, B, C, D, E, F, G, and H) between each radial cutting edge (20a, 20b, 20c, and 20d) and the variation between the helix angles (Xa, Xb, Xc, and Xd) of each radial cutting edge (20a, 20b, 20c, and 20d). The variation of circumferencial indexes (A, B, C, D, E, F, G, and H) insures that each radial cutting edge (20a, 20b, 20c, and 20d) is out of sequence with each other thereby eliminating an equally repeated sound pattern, thus reducing the likelihood of the tool 10 producing a resonant harmonic vibration. Also, the variation of the helix angles (Xa, Xb, Xc, and Xd) on the radial cutting edges (20a, 20b, 20c, and 20d) impart a change in the sound patterns each radial cutting edge (20a, 20b, 20c, and 20d) will produce during the machining operation, due to the change in the angle of impact of each radial cutting edge (20a, 20b, 20c, and 20d) into the work material. This, in addition to the variation of circumferencial indexes (A, B, C, D, E, F, G, and H), greatly reduces the likelihood of the tool 10 producing a resonant harmonic vibration. With the variation of circumferencial indexes (A, B, C, D, E, F, G, and H) between each radial cutting edge (20a, 20b, 20c, and 20d) and the variation between the helix angles (Xa, Xb, Xc, and Xd) of each radial cutting edge (20a, 20b, 20c, and 20d), it is insured that all radial cutting edges (20a, 20b, 20c, and 20d) as a whole remain unequal to each other along any given plane perpendicular to the rotational axis 16 for the entire cutting length L.

Figure 3:
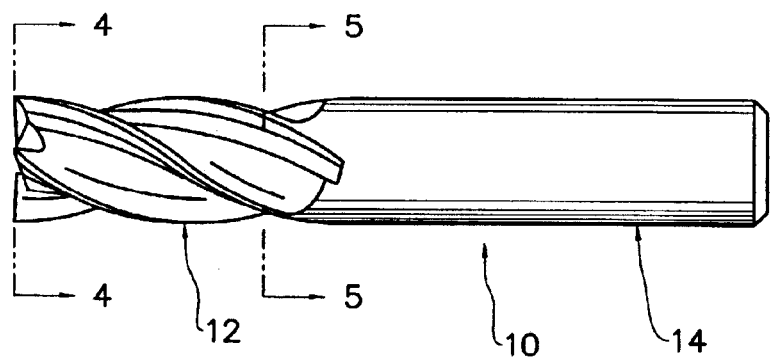
FIG. 3 is the same as FIG. 1 but showing location for the end view for FIG. 4 and the cross-sectional view for FIG. 5.

FIG. 3 shows an end mill 10 being the same as FIG. 1 that includes: a cutting body 12 and a shank 14. This illustration is used to locate an end view FIG. 4 and a cross-section FIG. 5 of the cutting body 12, to explain the variation of circumferencial indexes (A, B, C, D, E, F, G, and H) in relationship to the radial cutting edges (20a, 20b, 20c, and 20d).

Figure 4:
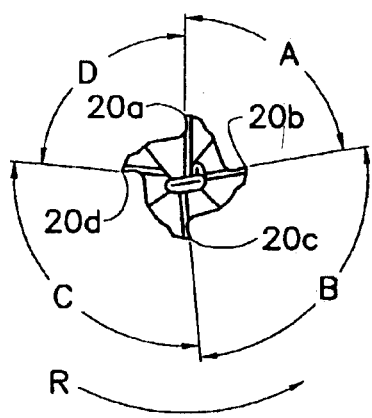
FIG. 4 is the end view of the cutting tool of FIG. 1 and of FIG. 3 taken along the line 4—4 of FIG. 3.

FIG. 4 shows the end view of the cutting body 12 in FIG. 3 taken along the line 4—4 of FIG. 3, further explaining the relationship of the variation in the circumferencial indexes (A, B, C, and D) and the radial cutting edges (20a, 20b, 20c, and 20d) as shown in FIG. 2. Also shown is reference to the cutting body 12 rotational direction R.

Figure 5:
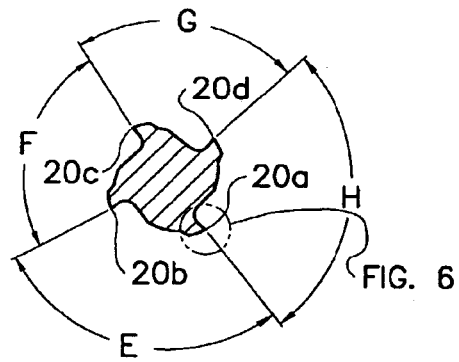
FIG. 5 is the cross-sectional view of the cutting tool of FIG. 1 and of FIG. 3 taken along the line 5—5 of FIG. 3, also showing the location for FIG. 6.

FIG. 5 shows a cross-section view of the back of the cutting body 12 in FIG. 3 taken along the line 5—5 of FIG. 3, further explaining the relationship of the variation in the circumferencial indexes (E, F, G, and H) and the radial cutting edges (20a, 20b, 20c, and 20d) as shown in FIG. 2.

Figure 6:
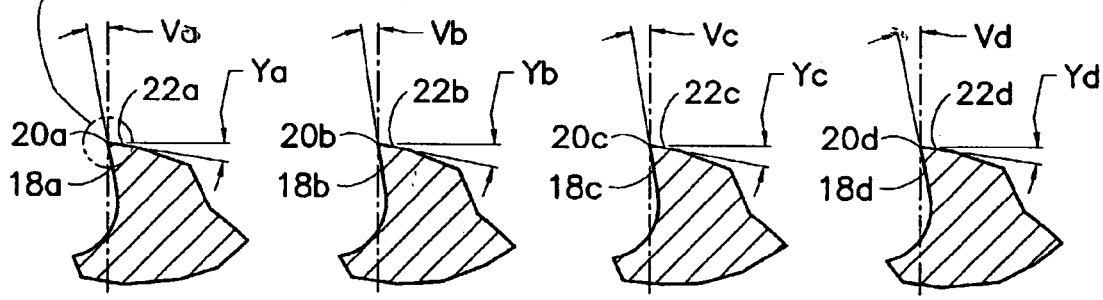
FIG. 6 is an enlarged fragmentary cross-sectional view of all peripheral cutting edges in accordance with the present invention, taken from the view of FIG. 5.

FIG. 6 shows an enlarged fragmentary cross-sectional view representing all radial cutting edges (20a, 20b, 20c, and 20d). It is indicated across the cutting length L that: the radial cutting edge 20a has a radial rake face 18a with an angle of Va, a radial relief surface 22a at an angle of Ya in relation to radial cutting edges (20b, 20c, and 20d); the radial cutting edge 20b has a radial rake face 18b with an angle of Vb, a radial relief surface 22b at an angle of Yb in relation to radial cutting edges (20a, 20c, and 20d); the radial cutting edge 20c has a radial rake face 18c with an angle of Vc, a radial relief surface 22c at an angle of Yc in relation to radial cutting edges (20a, 20b, and 20d); the radial cutting edge 20d has a radial rake face 18d with an angle of Vd, a radial relief surface 22d at an angle of Yd in relation to radial cutting edges (20a, 20b, and 20c). This view impart, shows the remaining two of the four main features of the first embodiment of this invention, these being the variation of the radial rake faces (18a, 18b, 18c, and 18d) and the radial relief surfaces (22a, 22b, 22c, and 22d). The variation of the radial rake faces (18a, 18b, 18c, and 18d) on the radial cutting edges (20a, 20b, 20c, and 20d), impart a change in the sound patterns each radial cutting edge (20a, 20b, 20c, and 20d) will produce during the machining operation. To further explain this, it is known that the radial rake face (18a, 18b, 18c, and 18d) of the cutting body 12, impacts the work material at an angle, thus compressing the material along its face into a smaller amount of deformed material called a chip. This chip is what is cut and removed from the material during the machining process. By varying the radial rake faces (18a, 18b, 18c, and 18d) on the radial cutting edges (20a, 20b, 20c, and 20d) each radial cutting edge impacts the work material differently, changing the way each chip is compressed and formed, thus producing a different sound pattern for each radial cutting edge (20a, 20b, 20c, and 20d). This, in addition to, the variation of circumferencial indexes (A, B, C, D, E, F, G, and H), and the variation of the helix angles (Xa, Xb, Xc, and Xd), again further reduces the likelihood of the tool 10 producing a resonant harmonic vibration. The variation of the radial relief surfaces (22a, 22b, 22c, and 22d) on the radial cutting edges (20a, 20b, 20c, and 20d) also impart a change in the sound patterns that each radial cutting edge (20a, 20b, 20c, and 20d) will produce during the machining operation. To further explain this, it is known that the radial relief surfaces (22a, 22b, 22c, and 22d) are the surfaces behind the cutting edges (20a, 20b, 20c, and 20d) set at an angle to allow the cutting body 12 to move through the part without rubbing (i.e., contacting) the work material during the machining process. The degree of angle the radial relief surfaces (22a, 22b, 22c, and 22d) are required to be set at is determined by the amount of material to be cut (removed) by each radial cutting edge (20a, 20b, 20c, and 20d). When a rotary cutting tool 10 is manufactured with a sharp radial cutting edge (20a, 20b, 20c, and 20d), when first used in a machining operation, it tends to move (i.e., bite) into the work material following an angular plane similar to the angle the radial relief surfaces (22a, 22b, 22c, and 22d) are set at. This movement in a rotary cutting tool 10, where the cutting body 12 has total equality, causes a forced chatter vibration, due to its constant, repeated, and uncontrollable movement in and out of the work material. By varying the angle in which the radial relief surfaces (22a, 22b, 22c, and 22d) are set at, the cutting body 12 will move in and out of the work material on different planes. This reduces the forced chatter vibration and also causes each radial cutting edge (20a, 20b, 20c, and 20d) to produce a different sound pattern, thereby reducing the likelihood of the tool 10 producing a resonant harmonic vibration.

Figure 7:
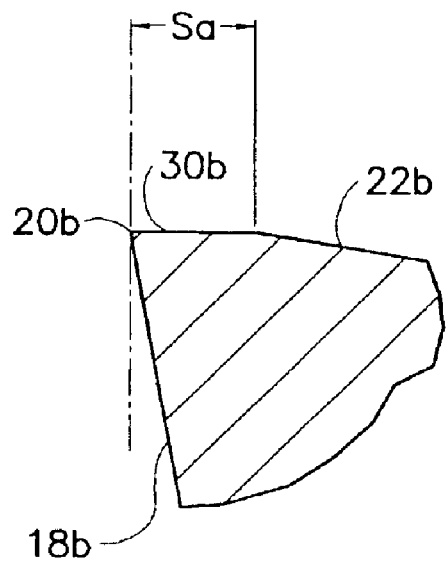
FIG. 7 is a greatly enlarged fragmentary cross-sectional view of all peripheral cutting edges in accordance with the present invention, taken from the view of FIG. 6.
Figure 7:
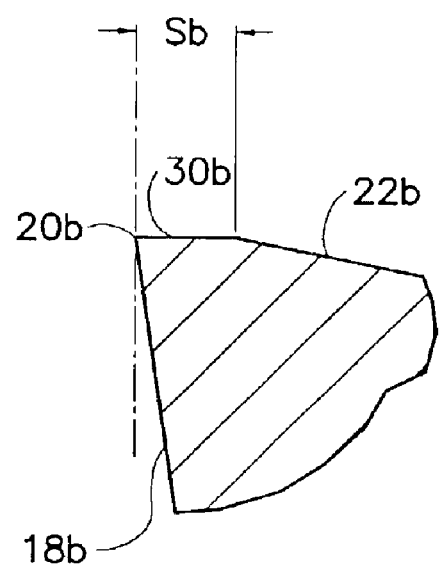
Figure 7:
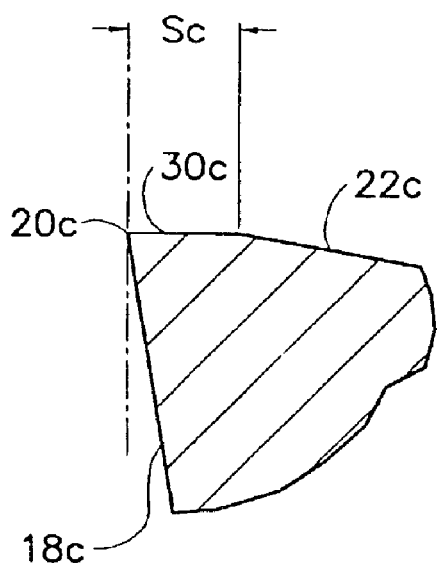
Figure 7:
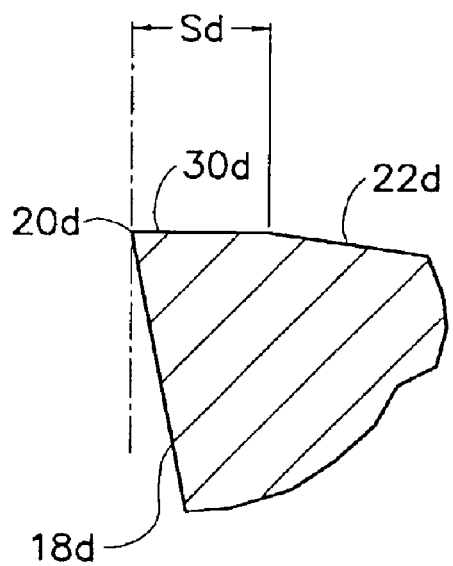

FIG. 7 shows a greatly enlarged fragmentary cross-sectional view representing all radial cutting edges (20a, 20b, 20c, and 20d). During the machining process a small amount of the radial cutting edge (20a, 20b, 20c, and 20d) sub-straight (the material the cutting body 12 is made of) wears away, producing a wear land (30a, 30b, 30c, and 30d) (a cylindrical surface that has no relief). When a rotary cutting tool 10 is first put into use, it will develop a small wear land (30a, 30b, 30c, and 30d) at the radial cutting edges (20a, 20b, 20c, and 20d). This small wear land (30a, 30b, 30c, and 30d) actually creates stability in the tool 10, by eliminating the radial relief plane adjacent to the radial cutting edges (20a, 20b, 20c, and 20d), thus not allowing the tool 10 to move in and out of the work material producing forced chatter vibration. Most machinists and rotary cutting tool manufactures would typically refer to this condition as: breaking in the tool. Thereby varying the angle in which the radial relief surfaces (22a, 22b, 22c, and 22d) are set at, they will generate a variation in the widths (Sa, Sb, Sc, and Sd) of the wear lands (30a, 30b, 30c, and 30d) produced on the tool 10. Because the wear lands (30a, 30b, 30c, and 30d) are cylindrical in nature, they rub (i.e., contact) the surface of the work material causing a sound pattern to be produced. Thus, when the wear lands (30a, 30b, 30c, and 30d) are of different widths (Sa, Sb, Sc, and Sd), they produce different sounds, again reducing the likelihood of the tool 10 producing a resonant harmonic vibration. This, in addition to the variation of circumferencial indexes (A, B, C, D, E, F, G, and H), the variation of the helix angles (Xa, Xb, Xc, and Xd), and the variation of the radial rake faces (18a, 18b, 18c, and 18d), once more adds further reduction to the likelihood of the tool 10 producing a resonant harmonic vibration.

In accordance with the first embodiment of the present invention, the example set forth in FIGS. 1 through 7 is that of a ½ inch diameter end mill. In which the geometries for said end mill are for cutting carbon, alloy, and stainless steels. The range of preferred geometries for said end mill in accordance with the first embodiment of the present invention are as follows: the range of variation for the circumferencial indexes (A, B, C, D, E, F, G, and H) are between 75 and 105 degrees; the range of variation for the helix angles (Xa, Xb, Xc, and Xd) are between 27 and 37 degrees; the range of variation for the radial rake faces (18a, 18b, 18c, and 18d) are between 8 and 12 degrees; the range of variation for the radial relief surfaces (22a, 22b, 22c, and 22d) are between 7 and 13 degrees.

FIGS. 8 through 15 show a modified four-flute end mill in accordance with the second and preferred embodiment of the present invention.

Figure 8:
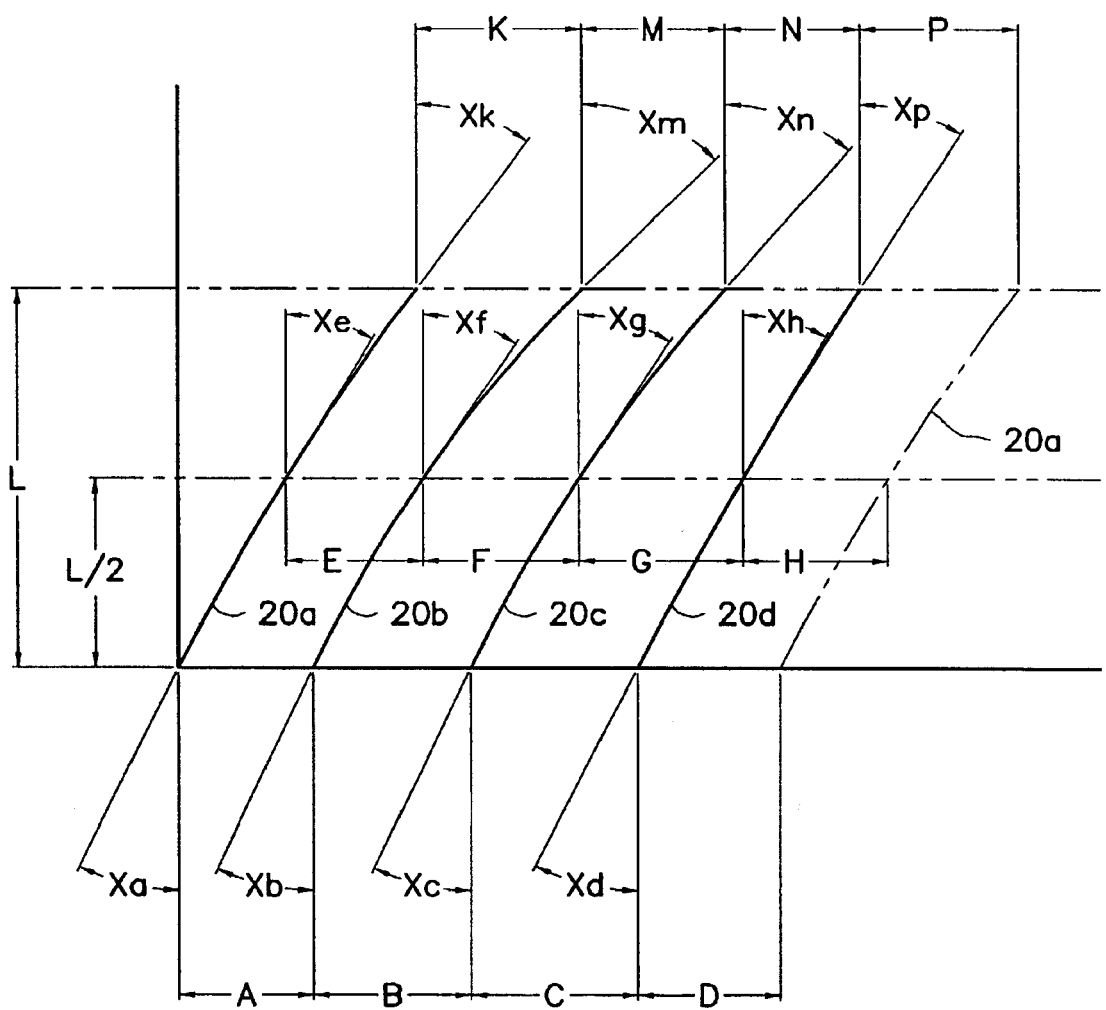
FIG. 8 is a view similar to FIG. 2, but showing the schematic development view of the modified cutting tool of FIG. 9.
Figure 9:
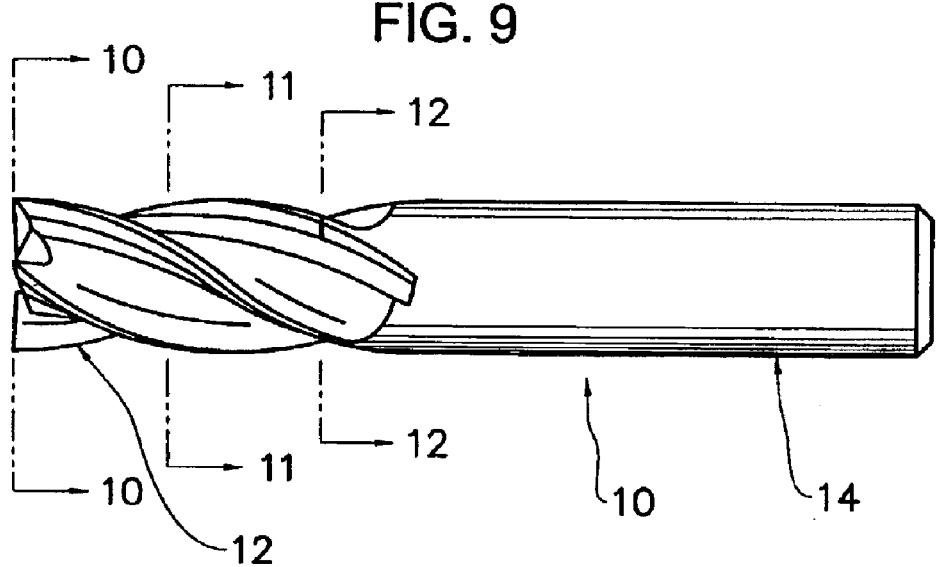
FIG. 9 is a view similar to FIG. 1 and FIG. 3, but showing a modified cutting tool in accordance with the present invention, along with the location of the end view for FIG. 10 and the cross-sectional views for FIG. 11 and for FIG. 12.

FIG. 8 is a view similar to FIG. 2, but showing a modified schematic view of the circumference of the cutting body 12 of FIG. 9. In this schematic view it is shown across the cutting length L that: the radial cutting edge 20a has a helix angle of Xa, a circumferencial index difference of angle A in relation to radial cutting edge 20b at the front of the cutting body 12, a helix angle of Xe, a circumferencial index difference of angle E in relation to radial cutting edge 20b at the midpoint L/2 of the cutting body 12, and a helix angle of Xk, a circumferencial index difference of angle K in relation to radial cutting edge 20b at the back of the cutting body 12; the radial cutting edge 20b has a helix angle of Xb, a circumferencial index difference, of angle B in relation to radial cutting edge 20c at the front of the cutting body 12, a helix angle of Xf, a circumferencial index difference of angle F in relation to radial cutting edge 20c at the midpoint L/2 of the cutting body 12, and a helix angle of Xm, a circumferencial index difference of angle M in relation to radial cutting edge 20c at the back of the cutting body 12; the radial cutting edge 20c has a helix angle of Xc, a circumferencial index difference of angle C in relation to radial cutting edge 20b at the front of the cutting body 12, a helix angle of Xg, a circumferencial index difference of angle G in relation to radial cutting edge 20c at the midpoint L/2 of the cutting body 12, and a helix angle of Xn, a circumferencial index difference of angle N in relation to radial cutting edge 20c at the back of the cutting body 12; the radial cutting edge 20d has a helix angle of Xd, a circumferencial index difference of angle D in relation to radial cutting edge 20a at the front of the cutting body 12, a helix angle of Xh, a circumferencial index difference of angle H in relation to radial cutting edge 20a at the midpoint L/2 of the cutting body 12, and a helix angle of Xp, a circumferencial index difference of angle P in relation to radial cutting edge 20a at the back of the cutting body 12. With reference to the first embodiment of this invention, and in accordance with the second and preferred embodiment of the present invention, this view shows additional variation of circumferencial indexes (A, B, C, D, E, F, G, H, K, M, N and P) between each radial cutting edge (20a, 20b, 20c, and 20d). It is also shows the additional variation of the helix angles (Xa, Xb, Xc, Xd, Xe, Xf, Xg, Xh, Xk, Xm, Xn, and Xp) between each radial cutting edge (20a, 20b, 20c, and 20d) along with continuous variation in and amongst themselves. This constant variation in the helix angles (Xa, Xb, Xc, Xd, Xe, Xf, Xg, Xh, Xk, Xm, Xn, and Xp) creates a constant variation of circumferencial indexes (A, B, C, D, E, F, G, H, K, M, N and P) insuring that each radial cutting edge (20a, 20b, 20c, and 20d) is continually out of sequence with each other thereby eliminating any repeated sound pattern. Also, the constant variation of the helix angles (Xa, Xb, Xc, Xd, Xe, Xf, Xg, Xh, Xk, Xm, Xn, and Xp) on the radial cutting edges (20a, 20b, 20c, and 20d) impart a continuous change in the sound patterns each cutting edge will produce during the machining operation, due to the continuously changing angle of impact of each radial cutting edge (20a, 20b, 20c, and 20d) into the work material. Thus the likelihood of the tool 10 producing a resonant harmonic vibration would be highly unlikely. With the continuous variation of circumferencial indexes (A, B, C, D, E, F, G, H, K, M, N and P) and the continuous variation of the helix angles (Xa, Xb, Xc, Xd, Xe, Xf, Xg, Xh, Xk, Xm, Xn, and Xp) of each radial cutting edge (20a, 20b, 20c, and 20d), it is insured that all radial cutting edges (20a, 20b, 20c, and 20d) as a whole remain unequal to each other along any given plane perpendicular to the rotational axis 16 for the entire cutting length L.

FIG. 9 shows a modified end mill 10 similar to FIG. 3 that includes: a cutting body 12 and a shank 14. This illustration it is used to locate an end view FIG. 10, a cross-section FIG. 11 at the midpoint L/2 of the cutting body 12, a cross-section FIG. 12 at the back of the cutting body 12, to explain the variation of circumferencial indexes (A, B, C, D, E, F, G, H, K, M, N and P) in relationship to the radial cutting edges (20a, 20b, 20c, and 20d).

Figure 10:
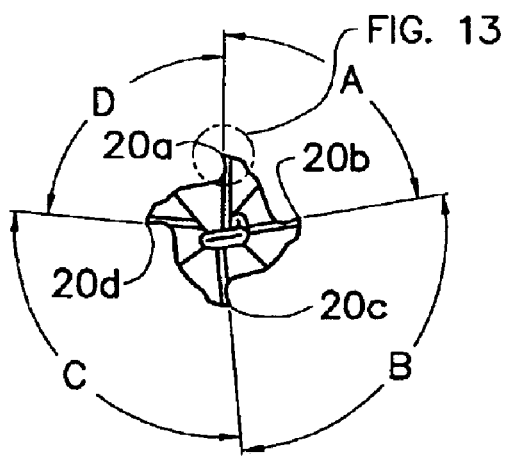
FIG. 10 is a view similar to FIG. 4, showing the end view of the cutting tool of FIG. 9 taken along the line 10—10 of FIG. 9, also showing the location for FIG. 13.

FIG. 10 shows the end view of the cutting body 12 in FIG. 9 taken along the line 10—10 of FIG. 9, further explaining the relationship of the variation in the circumferencial indexes (A, B, C, and D) and the radial cutting edges (20a, 20b, 20c, and 20d) as shown in FIG. 8.

Figure 11:
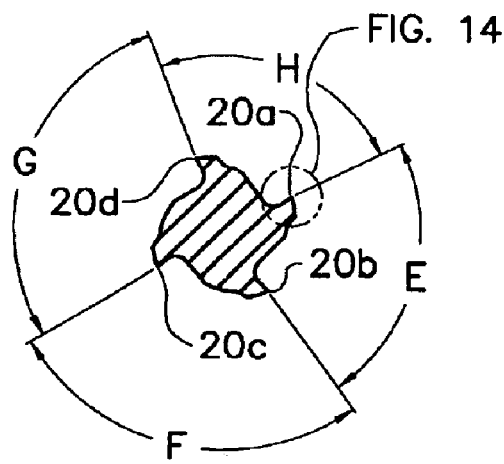
FIG. 11 is a view similar to FIG. 5, showing the cross-sectional view of the cutting tool of FIG. 9 taken along the line 11—11 of FIG. 9, also showing the location for FIG. 14.

FIG. 11 shows a cross-section view of the midpoint L/2 of the cutting body 12 in FIG. 9 taken along the line 11—11 of FIG. 9, further explaining the relationship of the variation in the circumferencial indexes (E, F, G, and H) and the radial cutting edges (20a, 20b, 20c, and 20d) as shown in FIG. 8.

Figure 12:
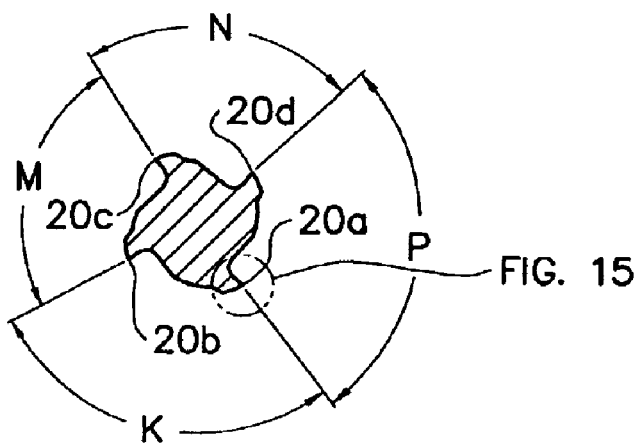
FIG. 12 is a view similar to FIG. 5 and FIG. 11, showing the cross-sectional view of the cutting tool of FIG. 9 taken along the line 12—12 of FIG. 9, also showing the location for FIG. 15.

FIG. 12 shows a cross-section view of the back of the cutting body 12 in FIG. 9 taken along the line 12—12 of FIG. 9, further explaining the relationship of the variation in the circumferencial indexes (K, M, N, and P) and the radial cutting edges (20a, 20b, 20c, and 20d) as shown in FIG. 8.

Figure 13:
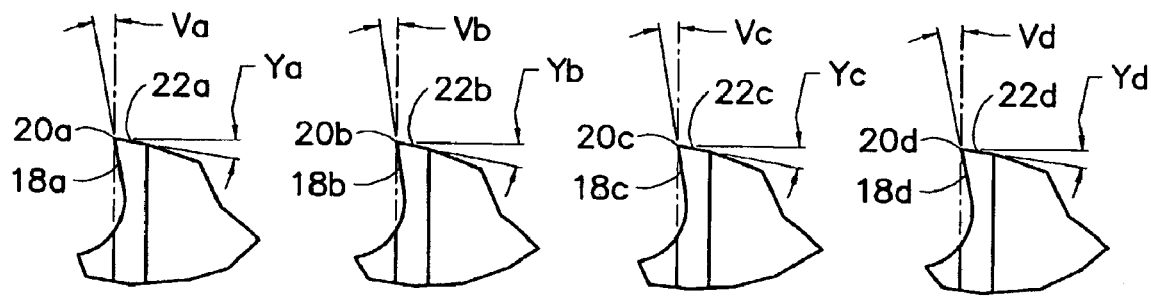
FIG. 13 is a view similar to FIG. 6, showing an enlarged fragmentary end view of all peripheral cutting edges of the cutting tool of FIG. 9, taken from the view of FIG. 10.
Figure 14:
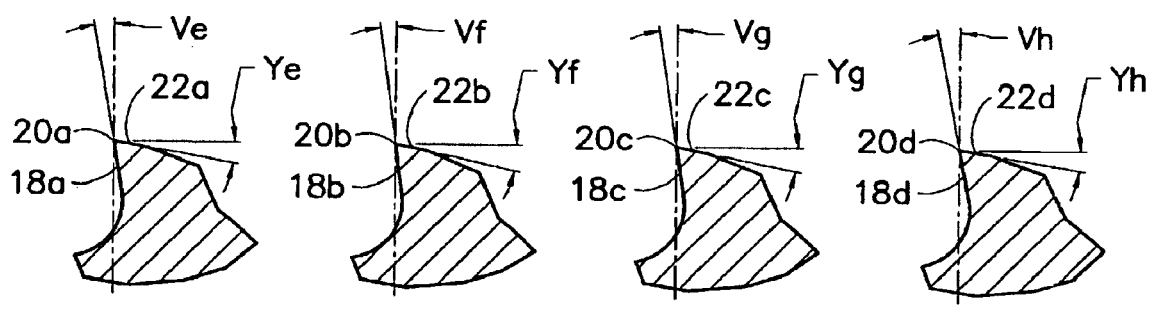
FIG. 14 is a view similar to FIG. 6 and FIG. 13, showing an enlarged fragmentary cross-sectional view of all peripheral cutting edges of the cutting tool of FIG. 9, taken from the view of FIG. 11.
Figure 15:
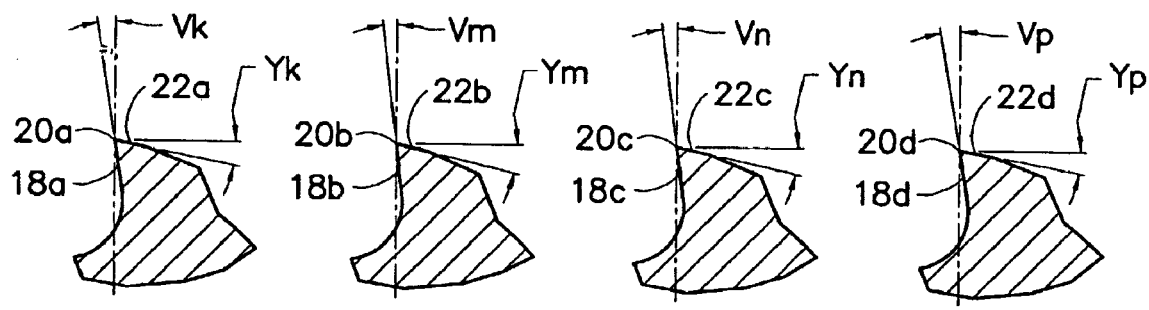
FIG. 15 is a view similar to FIG. 6, FIG. 13 and FIG. 14, showing an enlarged fragmentary cross-sectional view of all peripheral cutting edges of the cutting tool of FIG. 9, taken from the view of FIG. 12.

With reference to the first embodiment of this invention, FIGS. 13 through 15 show the additional variation of the radial rake faces (18a, 18b, 18c, and 18d) and the radial relief surfaces (22a, 22b, 22c, and 22d) as they apply in accordance with the second and preferred embodiment of the present invention.

FIG. 13 shows an enlarged fragmentary end view representing all radial cutting edges (20a, 20b, 20c, and 20d) at the front of the cutting body 12 as taken form the view point of FIG. 10. It is indicated across the cutting length L that: the radial cutting edge 20a has a radial rake face 18a with an angle of Va, a radial relief surface 22a at an angle of Ya in relation to radial cutting edges (20b, 20c, and 20d); the radial cutting edge 20b has a radial rake face 18b with an angle of Vb, a radial relief surface 22b at an angle of Yb in relation to radial cutting edges (20a, 20c, and 20d); the radial cutting edge 20c has a radial rake face 18c with an angle of Vc, a radial relief surface 22c at an angle of Yc in relation to radial cutting edges (20a, 20b, and 20d); the radial cutting edge 20d has a radial rake face 18d with an angle of Vd, a radial relief surface 22d at an angle of Yd in relation to radial cutting edges (20a, 20b, and 20c).

FIG. 14 shows an enlarged fragmentary cross-sectional view representing all radial cutting edges (20a, 20b, 20c, and 20d) at the midpoint L/2 of the cutting body 12 as taken form the view point of FIG. 11. It is indicated across the cutting length L that: the radial cutting edge 20a has a radial rake face 18a with an angle of Ve, a radial relief surface 22a at an angle of Ye in relation to radial cutting edges (20b, 20c, and 20d); the radial cutting edge 20b has a radial rake face 18b with an angle of Vf, a radial relief surface 22b at an angle of Yf in relation to radial cutting edges (20a, 20c, and 20d); the radial cutting edge 20c has a radial rake face 18c with an angle of Vg, a radial relief surface 22c at an angle of Yg in relation to radial cutting edges (20a, 20b, and 20d); the radial cutting edge 20d has a radial rake face 18d with an angle of Vh, a radial relief surface 22d at an angle of Yh in relation to radial cutting edges (20a, 20b, and 20c).

FIG. 15 shows an enlarged fragmentary cross-sectional view representing all radial cutting edges (20a, 20b, 20c, and 20d) at the back of the cutting body 12 as taken form the view point of FIG. 12. It is indicated across the cutting length L that: the radial cutting edge 20a has a radial rake face 18a with an angle of Vk, a radial relief surface 22a at an angle of Yk in relation to radial cutting edges (20b, 20c, and 20d); the radial cutting edge 20b has a radial rake face 18b with an angle of Vm, a radial relief surface 22b at an angle of Ym in relation to radial cutting edges (20a, 20c, and 20d); the radial cutting edge 20c has a radial rake face 18c with an angle of Vn, a radial relief surface 22c at an angle of Yn in relation to radial cutting edges (20a, 20b, and 20d); the radial cutting edge 20d has a radial rake face 18d with an angle of Vp, a radial relief surface 22d at an angle of Yp in relation to radial cutting edges (20a, 20b, and 20c).

The constant variation of the radial rake faces (18a, 18b, 18c, and 18d) on the radial cutting edges (20a, 20b, 20c, and 20d), impart a continuous change in the sound patterns each radial cutting edge (20a, 20b, 20c, and 20d), will produce during the machining operation. By continuously varying the radial rake faces (18a, 18b, 18c, and 18d) on the radial cutting edges (20a, 20b, 20c, and 20d), each radial cutting edge (20a, 20b, 20c, and 20d) impacts the work material at a continuously varying angle, changing the way each chip is compressed and formed throughout the entire cutting length L. This, in addition to the constant variation of circumferencial indexes (A, B, C, D, E, F, G, H, K, M, N and P) and the continuous variation of the helix angles (Xa, Xb, Xc, Xd, Xe, Xf, Xg, Xh, Xk, Xm, Xn, and Xp), again further reduces the likelihood of the tool 10 producing a resonant harmonic vibration.

The constant variation of the radial relief surfaces (22a, 22b, 22c, and 22d) on the radial cutting edges (20a, 20b, 20c, and 20d) also impart a continuous change in the sound patterns that each radial cutting edge (20a, 20b, 20c, and 20d) will produce during the machining operation. By continuously varying the angle in which the radial relief surfaces (22a, 22b, 22c, and 22d) are set at, the cutting body 12 will move in and out of the work material on continuously changing planes, thus adding further reduction of any forced chatter vibration. Also, the constant variation of the radial relief surfaces (22a, 22b, 22c, and 22d) on the radial cutting edges (20a, 20b, 20c, and 20d) will cause a continuous variation of the wear lands (30a, 30b, 30c, and 30d) that are produced. They will generate continuously changing widths (Sa, Sb, Sc, and Sd) along the entire cutting length L, thus causing each cutting edge (20a, 20b, 20c, and 20d) to produce a continuously changing sound pattern throughout the entire cutting length L. This, in addition to the constant variation of circumferencial indexes (A, B, C, D, E, F, G, H, K, M, N and P), the continuous variation of the helix angles (Xa, Xb, Xc, Xd, Xe, Xf, Xg, Xh, Xk, Xm, Xn, and Xp) and the constant variation of the radial rake faces (18a, 18b, 18c, and 18d), again further reduces the likelihood of the tool 10 producing a resonant harmonic vibration.

In accordance with the second and preferred embodiment of the present invention, the example set forth in FIGS. 8 through 15 is that of a ½ inch diameter end mill. In this configuration, the geometries for said end mill are for cutting carbon, alloy, and stainless steel. The range of preferred geometries for said end mill in accordance with the second and preferred embodiment of the present invention are as follows: the range of variation for the circumferencial indexes (A, B, C, D, E, F, G, H, K, M, N and P) are between 70 and 110 degrees; the range of variation for the helix angles (Xa, Xb, Xc, Xd, Xe, Xf, Xg, Xh, Xk, Xm, Xn, and Xp) are between 25 and 40 degrees; the range of variation for the radial rake faces (18a, 18b, 18c, and 18d) are between 6 and 14 degrees; the range of variation for the radial relief surfaces (22a, 22b, 22c, and 22d) are between 5 and 15 degrees.

FIGS. 16 through 19 show a modified four-flute end mill in accordance with the third embodiment of the present invention, that being the addition variation of the axial cutting edges (26a, 26b, 26c, and 26d).

Figure 16:
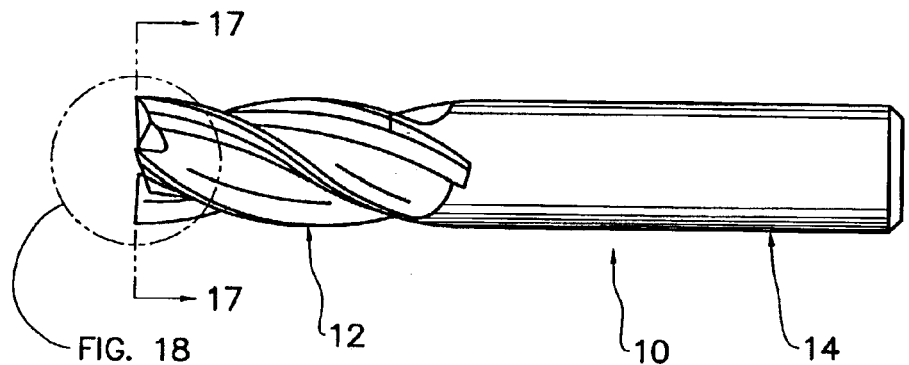
FIG. 16 is a view similar to FIG. 1, FIG. 3, and FIG. 9, but showing location for the enlarged end view of the axial cutting teeth for FIG. 17 and the enlarged side view of the axial cutting edges for FIG. 18.

FIG. 16 shows a modified end mill 10 the same as FIG. 9 that includes: a cutting body 12 and a shank 14. This illustration is used to locate an end view of the axial cutting teeth for FIG. 17 and the enlarged side view of the axial cutting edges for FIG. 18, to explain the addition variation of the axial cutting edges (26a, 26b, 26c, and 26d).

Figure 17:
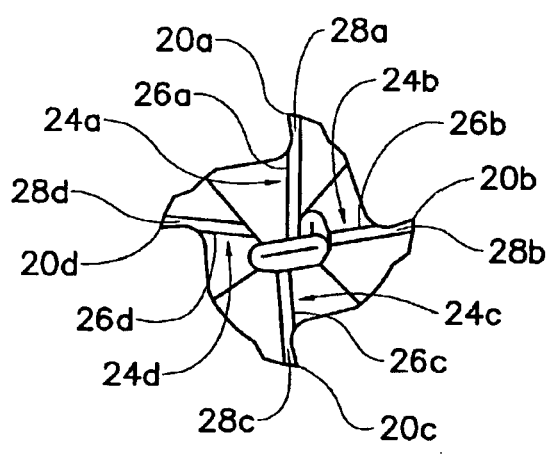
FIG. 17 is a view similar to FIG. 4, showing the enlarged end view of the axial cutting edges of the cutting tool for FIG. 16 taken along the line 17—17 of FIG. 16.

FIG. 17 shows the end view of the cutting body 12 in FIG. 16 taken along the line 17—17 of FIG. 16 that includes: four radial cutting edges (20a, 20b, 20c, and 20d); four axial cutting edges (26a, 26b, 26c, and 26d); four axial rake faces (24a, 24b, 24c, and 24d); four axial relief faces (28a, 28b, 28c, and 28d).

Figure 18:
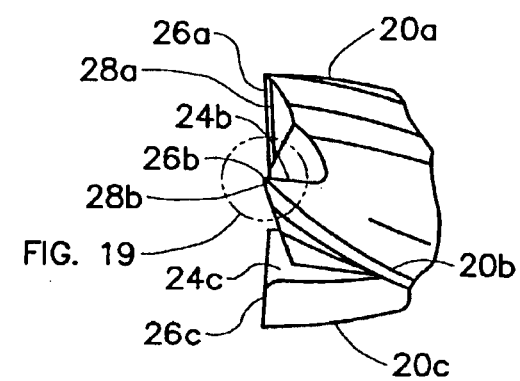
FIG. 18 is a view showing the enlarged side view of the axial cutting edges of the cutting tool for FIG. 16, taken from the view of FIG. 16, also showing the location for FIG. 19.

FIG. 18 shows the enlarged fragmentary side view of the cutting body 12 in FIG. 16 taken from the view of FIG. 16 that includes: three radial cutting edges (20a, 20b, and 20c); three axial cutting edges (26a, 26b, and 26c); two axial rake faces (24b and 24c); two axial relief faces (28a and 28b). This view also includes the location for FIG. 19.

Figure 19:
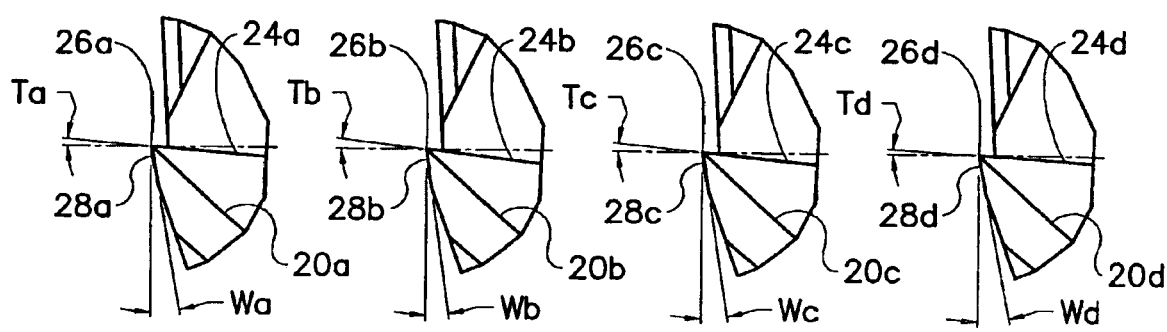
FIG. 19 is an enlarged fragmentary side view of all axial cutting edges of the cutting tool of FIG. 16, taken from the view of FIG. 18.

FIG. 19 shows an enlarged fragmentary side view representing all axial cutting edges (26a, 26b, 26c, and 26d). It is indicated on the axial cutting geometry that: the axial cutting edge 26a has an axial rake face 24a with an angle of Ta, an axial relief surface 28a at an angle of Wa in relation to axial cutting edges (26b, 26c, and 26d); the axial cutting edge 26b has an axial rake face 24b with an angle of Tb, an axial relief surface 28b at an angle of Wb in relation to axial cutting edges (26a, 26c, and 26d); the axial cutting edge 26c has an axial rake face 24c with an angle of Tc, an axial relief surface 28c at an angle of Wc in relation to axial cutting edges (26a, 26b, and 26d); the axial cutting edge 26d has an axial rake face 24d with an angle of Td, an axial relief surface 28d at an angle of Wd in relation to axial cutting edges (26a, 26b, and 26c).

With reference to the first embodiment and the second and preferred embodiment of this invention, this view shows the variation of the axial rake faces (24a, 24b, 24c, and 24d) and the axial relief surfaces (28a, 28b, 28c, and 28d). The variation of the axial rake faces (24a, 24b, 24c, and 24d) on the axial cutting edges (26a, 26b, 26c, and 26d) imparts a change in the sound patterns each cutting edge will produce during the machining operation. By varying the axial rake faces (24a, 24b, 24c, and 24d) on the axial cutting edges (26a, 26b, 26c, and 26d), while employing the axial cutting edges in a plunge or ramping direction during the machining operation, each axial rake face (24a, 24b, 24c, and 24d) impacts the work material at a different angle. This changes the way each chip is compressed and formed, thus producing a different sound pattern for each axial cutting edge (26a, 26b, 26c, and 26d). This further reduces the likelihood of the tool 10 producing a resonant harmonic vibration.

The variation of the axial relief surfaces (28a, 28b, 28c, and 28d) on the axial cutting edges (26a, 26b, 26c, and 26d) also imparts a change in the sound patterns that each cutting edge will produce during the machining operation. By varying the angle in which the axial relief surfaces (28a, 28b, 28c, and 28d) are set at, the cutting body 12 will move in and out of the work material on continuously changing planes, thus adding further reduction of any forced chatter vibration. Also, the variation of the axial relief surfaces (28a, 28b, 28c, and 28d) on the axial cutting edges (26a, 26b, 26c, and 26d) will cause a continuous variation of the wear lands (30a, 30b, 30c, and 30d) that are produced. They will generate continuously changing widths (Sa, Sb, Sc, and Sd) on each axial cutting edge (26a, 26b, 26c, and 26d), thus causing each axial cutting edge (26a, 26b, 26c, and 26d) to produce a different sound pattern. This, in addition to the variation of the axial rake faces (24a, 24b, 24c, and 24d) along with the elements of the first embodiment and the second and preferred embodiment, continues to further reduce the likelihood of the tool 10 producing a resonant harmonic vibration.

In accordance with the third embodiment of the present invention, the example set forth in FIGS. 16 through 19 is that of a ½ inch diameter end mill. In which the geometries for said end mill are for cutting carbon, alloy, and stainless steels. The range of preferred geometries for said end mill in accordance with the third embodiment of the present invention are as follows: the range of variation for the axial rake faces (24a, 24b, 24c, and 24d) are between 2 and 12 degrees; the range of variation for the axial relief surfaces (28a, 28b, 28c, and 28d) are between 5 and 13 degrees.

FIGS. 20 through 23 show a modified four-flute end mill in accordance with the forth embodiment of the present invention, that being the addition variation of contoured axial cutting edges (36a, 36b, 36c, and 36d).

Figure 20:
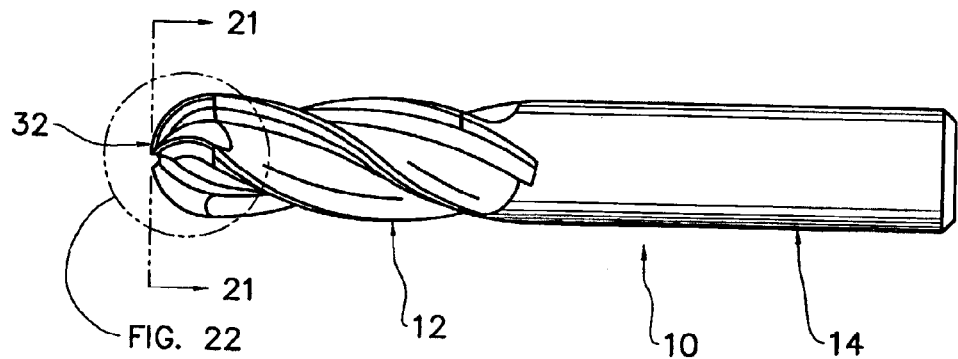
FIG. 20 is a view similar to FIG. 1, FIG. 3, FIG. 9, and FIG. 16, but showing a modified cutting tool in accordance with the present invention, along with the location for the enlarged end view of the axial cutting edges for FIG. 21 and the enlarged side view of the axial cutting edges for FIG. 22.

FIG. 20 shows a modified end mill 10 the same as FIG. 9 and FIG. 16, but with a contoured (i.e., ball) end configuration that includes: a cutting body 12, a shank 14 and a contoured end (32). This illustration is used to locate an end view of the contoured axial cutting teeth for FIG. 21 and the enlarged side view of the contoured axial cutting edges for FIG. 22, and to explain the additional variation of the contoured axial cutting edges (36a, 36b, 36c, and 36d).

Figure 21:
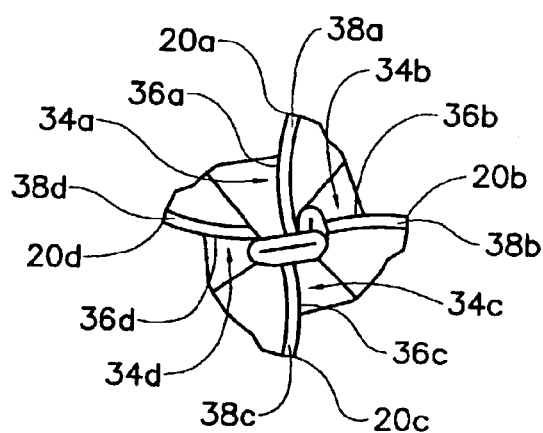
FIG. 21 is a view similar to FIG. 4, FIG. 10, and FIG. 17, showing the enlarged end view of the axial cutting edges of the cutting tool for FIG. 20 taken along the line 20–21 of FIG. 21.

FIG. 21 shows the end view of the cutting body 12 in FIG. 16 taken along the line 21—21 of FIG. 20 that includes: four radial cutting edges (20a, 20b, 20c, and 20d); four contoured axial cutting edges (36a, 36b, 36c, and 36d); four contoured axial rake faces (34a, 34b, 34c, and 34d); four contoured axial relief faces (38a, 38b, 38c, and 38d).

Figure 22:
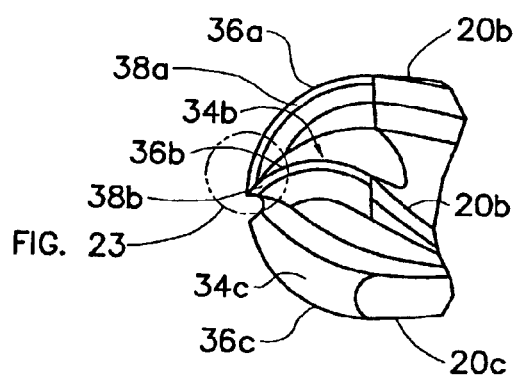
FIG. 22 is a view similar to FIG. 18, showing the enlarged side view of the axial cutting edges of the cutting tool for FIG. 20, taken from the view of FIG. 20, also showing the location for FIG. 23.

FIG. 22 shows the enlarged fragmentary side view of the cutting body 12 in FIG. 20 taken from the view of FIG. 20 that includes: three radial cutting edges (20a, 20b, and 20c); three contoured axial cutting edges (36a, 36b, and 36c); two contoured axial rake faces (34b and 34c); two contoured axial relief faces (38a and 38b). This view also includes the location for FIG. 23.

Figure 23:
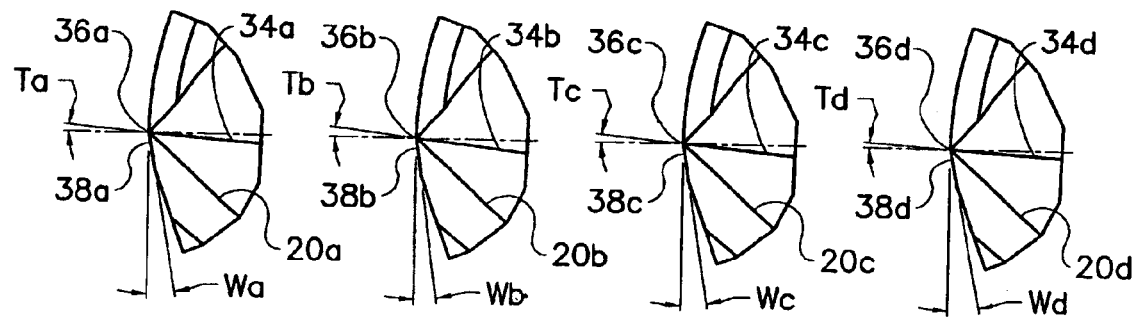
FIG. 23 is a view similar to FIG. 19, showing the enlarged fragmentary side view of all axial cutting edges of the cutting tool of FIG. 20, taken from the view of FIG. 22.

FIG. 23 shows an enlarged fragmentary side view representing all contoured axial cutting edges (36a, 36b, 36c, and 36d). It is indicated on the contoured axial cutting geometry that: the contoured axial cutting edge 36a has a contoured axial rake face 34a with an angle of Ta, and a contoured axial relief surface 38a at an angle of Wa in relation to contoured axial cutting edges (36b, 36c, and 36d); the contoured axial cutting edge 36b has a contoured axial rake face 34b with an angle of Tb, and a contoured axial relief surface 38b at an angle of Wb in relation to contoured axial cutting edges (36a, 36c, and 36d); the contoured axial cutting edge 36c has a contoured axial rake face 34c with an angle of Tc, and a contoured axial relief surface 38c at an angle of Wc in relation to contoured axial cutting edges (36a, 36b, and 36d); the contoured axial cutting edge 36d has a contoured axial rake face 34d with an angle of Td, and a contoured axial relief surface 38d at an angle of Wd in relation to contoured axial cutting edges (36a, 36b, and 36c).

With reference to the first embodiment, the second and preferred embodiment and third embodiment of this invention, this view shows the variation of the contoured axial rake faces (34a, 34b, 34c, and 34d) and the contoured axial relief surfaces (38a, 38b, 38c, and 38d). The variation of the contoured axial rake faces (34a, 34b, 34c, and 34d) on the contoured axial cutting edges (36a, 36b, 36c, and 36d) imparts a change in the sound patterns each cutting edge will produce during the machining operation. By varying the contoured axial rake faces (34a, 34b, 34c, and 34d) on the contoured axial cutting edges (36a, 36b, 36c, and 36d), while employing the contoured axial cutting edges in a plunge, ramping or contour direction during the machining operation, each contoured axial rake face (34a, 34b, 34c, and 34d) impacts the work material at a different angle. This changes the way each chip is compressed and formed, thus producing a different sound pattern for each contoured axial cutting edge (36a, 36b, 36c, and 36d). This further reduces the likelihood of the tool 10 producing a resonant harmonic vibration.

The variation of the contoured axial relief surfaces (38a, 38b, 38c, and 38d) on the contoured axial cutting edges (36a, 36b, 36c, and 36d) also imparts a change in the sound patterns that each cutting edge will produce during the machining operation. By varying the angle in which the contoured axial relief surfaces (38a, 38b, 38c, and 38d) are set at, the cutting body 12 will move in and out of the work material on continuously changing planes, thus adding further reduction of any forced chatter vibration. Also, the variation of the contoured axial relief surfaces (38a, 38b, 38c, and 38d) on the contoured axial cutting edges (36a, 36b, 36c, and 36d) will cause a continuous variation of the wear lands (30a, 30b, 30c, and 30d) that are produced. They will generate continuously changing widths (Sa, Sb, Sc, and Sd) on each contoured axial cutting edge (36a, 36b, 36c, and 36d), thus causing each contoured axial cutting edge (36a, 36b, 36c, and 36d) to produce a different sound pattern. This, in addition to, the variation of the contoured axial rake faces (34a, 34b, 34c, and 34d) along with the elements of the first embodiment and the second and preferred embodiment, continues to further reduce the likelihood of the tool 10 producing a resonant harmonic vibration.

In accordance with the forth embodiment of the present invention, the example set forth in FIGS. 20 through 23 is that of a ½ inch diameter end mill. In which the geometries for said end mill are for cutting carbon, alloy, and stainless steels. The range of preferred geometries for said end mill in accordance with the forth embodiment of the present invention are as follows: the range of variation for the contoured axial rake faces (34a, 34b, 34c, and 34d) are between 0 and 14 degrees; the range of variation for the contoured axial relief surfaces (38a, 38b, 38c, and 38d) are between 5 and 15 degrees.

The foregoing detailed description of the present invention has been provided for purposes of general illustration and description. It is not intended to be exhaustive nor does it limit the invention to the precise form as disclosed. Obviously, many modifications and variations to this embodiment are possible in light of the above teachings. The preferred embodiment has been selected and presented here solely to illustrate the principles of the present invention and its practical application, thus enabling one of ordinary skill in the art to make and use the invention in various embodiments in conjunction with one or more modifications that may be suitable for the use contemplated. Needless to say, the present invention may be practiced otherwise than as specifically described above.

As a result, various modifications and variations, let it be known, are within the scope of the present invention as determined by the appended claims when interpreted logically and in accordance with the breadth of such claims. Lastly, the invention has been described here in an illustrative manner and it is understood that the terminology that has been used in the description is intended to illustrate the nature of the description rather than of limitations. The terms used herein are reflective of their customary and ordinary meanings, unless stated otherwise.

Figure 24:
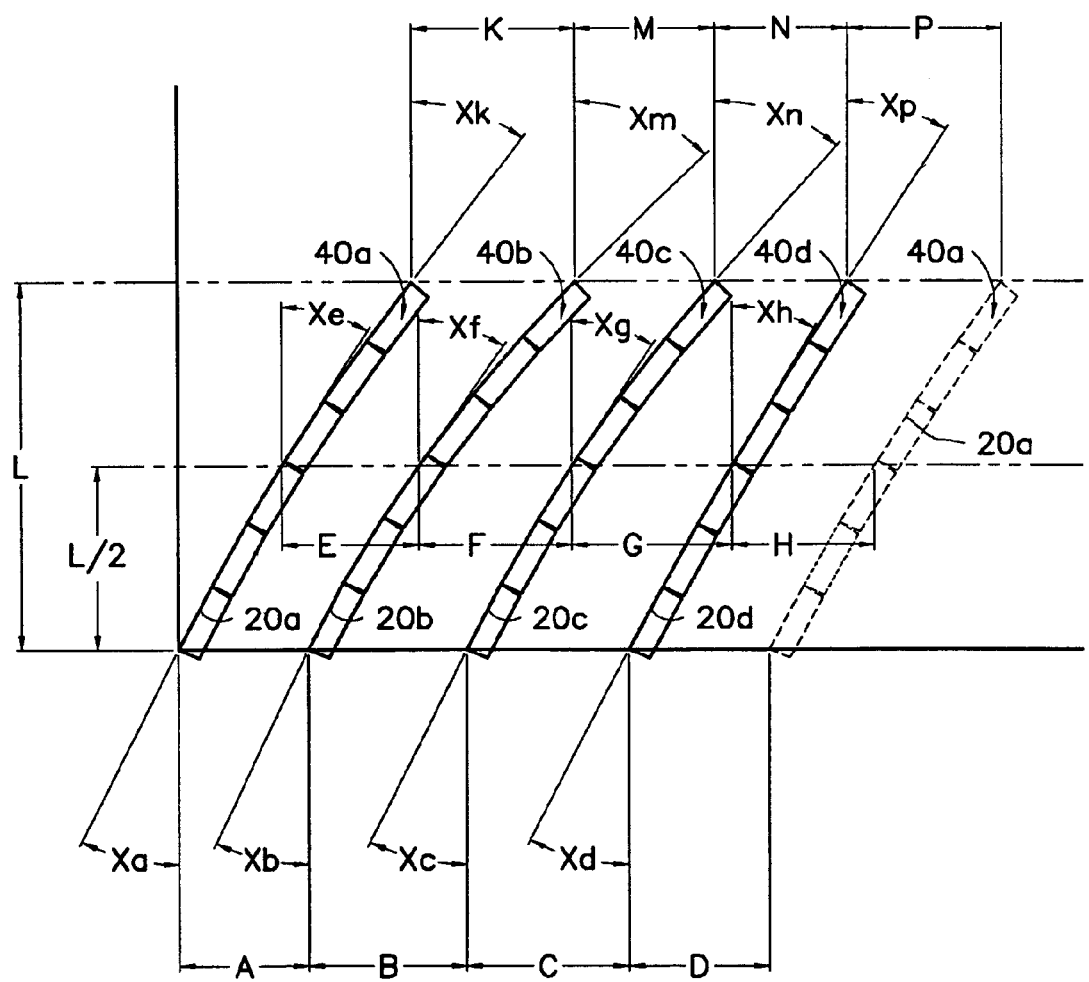
FIG. 24 is a view similar to FIG. 8, but showing the schematic development view with replaceable cutting inserts.

FIG. 24 is a view similar to FIG. 8, but includes a view of replaceable cutting inserts 40a, 40b, 40c, 40d. In this schematic view it is shown across the cutting length L that: the radial cutting edge 20a has a helix angle of Xa, a circumferencial index difference of angle A in relation to radial cutting edge 20b at the front of the cutting body 12, a helix angle of Xe, a circumferencial index difference of angle E in relation to radial cutting edge 20b at the midpoint L/2 of the cutting body 12, and a helix angle of Xk, a circumferencial index difference of angle K in relation to radial cutting edge 20b at the back of the cutting body 12; the radial cutting edge 20b has a helix angle of Xb, a circumferencial index difference, of angle B in relation to radial cutting edge 20c at the front of the cutting body 12, a helix angle of Xf, a circumferencial index difference of angle F in relation to radial cutting edge 20c at the midpoint L/2 of the cutting body 12, and a helix angle of Xm, a circumferencial index difference of angle M in relation to radial cutting edge 20c at the back of the cutting body 12; the radial cutting edge 20c has a helix angle of Xc, a circumferencial index difference of angle C in relation to radial cutting edge 20b at the front of the cutting body 12, a helix angle of Xg, a circumferencial index difference of angle G in relation to radial cutting edge 20c at the midpoint L/2 of the cutting body 12, and a helix angle of Xn, a circumferencial index difference of angle N in relation to radial cutting edge 20c at the back of the cutting body 12; the radial cutting edge 20d has a helix angle of Xd, a circumferencial index difference of angle D in relation to radial cutting edge 20a at the front of the cutting body 12, a helix angle of Xh, a circumferencial index difference of angle H in relation to radial cutting edge 20a at the midpoint L/2 of the cutting body 12, and a helix angle of Xp, a circumferencial index difference of angle P in relation to radial cutting edge 20a at the back of the cutting body 12. With reference to the first embodiment of this invention, and in accordance with the second and preferred embodiment of the present invention, this view shows additional variation of circumferencial indexes (A, B, C, D, E, F, G, H, K, M, N and P) between each radial cutting edge (20a, 20b, 20c, and 20d). It is also shows the additional variation of the helix angles (Xa, Xb, Xc, Xd, Xe, Xf, Xg, Xh, Xk, Xm, Xn, and Xp) between each radial cutting edge (20a, 20b, 20c, and 20d) along with continuous variation in and amongst themselves. This constant variation in the helix angles (Xa, Xb, Xc, Xd, Xe, Xf, Xg, Xh, Xk, Xm, Xn, and Xp) creates a constant variation of circumferencial indexes (A, B, C, D, E, F, G, H, K, M, N and P) insuring that each radial cutting edge (20a, 20b, 20c, and 20d) is continually out of sequence with each other thereby eliminating any repeated sound pattern. Also, the constant variation of the helix angles (Xa, Xb, Xc, Xd, Xe, Xf, Xg, Xh, Xk, Xm, Xn, and Xp) on the radial cutting edges (20a, 20b, 20c, and 20d) impart a continuous change in the sound patterns each cutting edge will produce during the machining operation, due to the continuously changing angle of impact of each radial cutting edge (20a, 20b, 20c, and 20d) into the work material. Thus the likelihood of the tool 10 producing a resonant harmonic vibration would be highly unlikely. With the continuous variation of circumferencial indexes (A, B, C, D, E, F, G, H, K, M, N and P) and the continuous variation of the helix angles (Xa, Xb, Xc, Xd, Xe, Xf, Xg, Xh, Xk, Xm, Xn, and Xp) of each radial cutting edge (20a, 20b, 20c, and 20d), it is insured that all radial cutting edges (20a, 20b, 20c, and 20d) as a whole remain unequal to each other along any given plane perpendicular to the rotational axis 16 for the entire cutting length L.

What is claimed is:

1. A rotary cutting tool, comprising:
   an elongated tool body having a center and rotatable along a longitudinal axis of rotation passing through said center of the tool body;
   a fluted cutting end and a shank end formed integrally opposite to said fluted cutting end, said fluted cutting end having a nose, a periphery and an end surface extending from said nose to said periphery, said shank end having a shank extending along said longitudinal axis of rotation; and
   a plurality of flutes, extending generally along said end surface in an axial direction of the tool body and located unsymmetrically with each other around said longitudinal axis of rotation so as to be spaced apart from each other, each said flute having an integral adjacent radial cutting edge running alongside said flute for engaging and cutting a workpiece, each said radial cutting edge being helically curved and having a radial cutting edge geometry whereby each said radial cutting edge lies on the surface of a circumscribing cylinder defined by the rotation of said radial cutting edges about said longitudinal axis of rotation of the tool body and each said radial cutting edge has a circumferencial index; and
   each said radial cutting edge having a helix, a radial rake, and a radial relief.

2. The rotary cutting tool of claim 1 wherein each said radial cutting edge performs the dual function of roughing and finishing.

3. The rotary cutting tool of claim 1 wherein said flutes are spaced angularly apart by unequal circumferencial indexes that together total 360 degrees.

4. The rotary cutting tool of claim 3 wherein each said unequal circumferencial index ranges generally from 10 degrees to 210 degrees.

5. The rotary cutting tool of claim 4 wherein each said unequal circumferencial index ranges from 70 degrees to 110 degrees.

6. The rotary cutting tool of claim 1 wherein said radial cutting edges are unsymmetrical to each other as said circumferencial indexes vary.

7. The rotary cutting tool of claim 1 wherein said radial cutting edges are unsymmetrical with each other in respect to said helixes, said radial rakes, and said radial reliefs.

8. The rotary cutting tool of claim 1 wherein said radial cutting edges are unsymmetrical to each other and within themselves as said circumferencial indexes vary.

9. The rotary cutting tool of claim 1 wherein said radial cutting edges are unsymmetrical with each other and within themselves in respect to said helixes, said radial rakes, and said radial reliefs.

10. The rotary cutting tool of claim 6 wherein said radial cutting edges differ from each other by one-half or more degrees in terms of said circumferencial index.

11. The rotary cutting tool of claim 7 wherein said radial cutting edges differ from each other by one-half or more degrees in terms of said helixes, said radial rakes, and said radial reliefs.

12. The rotary cutting tool of claim 8 wherein said radial cutting edges differ within themselves and from each other by one-half or more degrees in terms of said circumferencial index.

13. The rotary cutting tool of claim 9 wherein said radial cutting edges differ within themselves and from each other by one-half or more degrees in terms of said helixes, said radial rakes, and said radial reliefs.

14. The rotary cutting tool of claim 1 wherein said radial rake is a positive or a negative rake, or both.

15. The rotary cutting tool of claim 1 wherein said circumferencial indexes formed by said flutes are unequal and each said radial cutting edge falls within one said circumferencial index.

16. The rotary cutting tool of claim 1 wherein each said radial cutting edge geometry creates a different sound pattern that substantially reduces resonant harmonic vibrations.

17. The rotary cutting tool of claim 1 wherein said radial cutting geometries stabilize the tool body at accelerated rotational speeds and at greater depths of cut.

18. The rotary cutting tool of claim 1 wherein the tool body can rotate clockwise or counterclockwise.

19. The rotary cutting tool of claim 1 wherein the tool body is cylindrical, conical, or of contoured shape.

20. The rotary cutting tool of claim 1 wherein the tool body is of a roughing or finishing configuration.

21. The rotary cutting tool of claim 1 wherein the workpiece comprises a metal, ferrous or nonferrous.

22. The rotary cutting tool of claim 1 wherein the workpiece comprises an alloy.

23. The rotary cutting tool of claim 1 wherein the workpiece comprises a natural or a synthetic material.

24. A rotary cutting tool, comprising:
   an elongated tool body having a center and rotatable along a longitudinal axis of rotation passing through said center of the tool body;
   a fluted cutting end and a shank end formed integrally opposite to said fluted cutting end, said fluted cutting end having a nose, a periphery and an end surface extending from said nose to said periphery, said shank end having a shank extending along said longitudinal axis of rotation;

a plurality of flutes extending generally along said end surface in an axial direction of the tool body and located unsymmetrically with each other around said longitudinal axis of rotation so as to be spaced apart from each other, each said flute having an integral adjacent axial cutting edge running alongside said flute for engaging and cutting a workpiece and forming a circumferencial index with respect to its adjacent flute in a plane perpendicular to said longitudinal axis of rotation, each said axial cutting edge having an axial cutting edge geometry whereby each said axial cutting edge lies on the surface of a plane perpendicular to said longitudinal axis of rotation of the tool body; and each said axial cutting edge having an axial rake and an axial relief.

25. The rotary cutting tool of claim 24 wherein each said axial cutting edge performs the dual function of roughing and finishing.

26. The rotary cutting tool of claim 24 wherein said flutes are spaced angularly apart by unequal circumferencial indexes that together total 360 degrees.

27. The rotary cutting tool of claim 26 wherein each said unequal circumferencial index ranges generally from 10 degrees to 210 degrees.

28. The rotary cutting tool of claim 27 wherein each said unequal circumferencial index ranges from 70 degrees to 110 degrees.

29. The rotary cutting tool of claim 24 wherein said axial cutting edges are unsymmetrical to each other as said circumferencial indexes vary.

30. The rotary cutting tool of claim 24 wherein said axial cutting edges are unsymmetrical with each other in respect to said axial rakes and said axial reliefs.

31. The rotary cutting tool of claim 24 wherein said axial cutting edges are unsymmetrical to each other and within themselves as said circumferencial indexes vary.

32. The rotary cutting tool of claim 24 wherein said axial cutting edges are unsymmetrical with each other and within themselves in respect to said axial rakes and said axial reliefs.

33. The rotary cutting tool of claim 29 wherein said axial cutting edges differ from each other by one-half or more degrees in terms of said circumferencial index.

34. The rotary cutting tool of claim 30 wherein said axial cutting edges differ from each other by one-half or more degrees in terms of said axial rakes and said axial reliefs.

35. The rotary cutting tool of claim 31 wherein said axial cutting edges differ within themselves and from each other by one-half or more degrees in terms of said circumferencial index.

36. The rotary cutting tool of claim 32 wherein said axial cutting edges differ within themselves and from each other by one-half or more degrees in terms of said axial rakes and said axial reliefs.

37. The rotary cutting tool of claim 24 wherein said axial rake angle is a positive or a negative rake, or both.

38. The rotary cutting tool of claim 24 wherein said circumferencial indexes formed by said flutes are unequal and each said axial cutting edge falls within one said circumferencial index.

39. The rotary cutting tool of claim 24 wherein each said axial cutting edge geometry creates a different sound pattern that substantially reduces resonant harmonic vibrations.

40. The rotary cutting tool of claim 24 wherein said axial cutting geometries stabilize the tool body at accelerated rotational speeds and at greater depths of cut.

41. The rotary cutting tool of claim 24 wherein the tool body can rotate clockwise or counterclockwise.

42. The rotary cutting tool of claim 24 wherein the axial end face of tool body is cylindrical, conical, or of contoured shape.

43. The rotary cutting tool of claim 24 wherein the tool body is of a roughing or finishing configuration.

44. The rotary cutting tool of claim 24 wherein the workpiece comprises a metal, ferrous or nonferrous.

45. The rotary cutting tool of claim 24 wherein the workpiece comprises an alloy.

46. The rotary cutting tool of claim 24 wherein the workpiece comprises a natural or a synthetic material.

47. A rotary cutting tool, comprising:

an elongated tool body having a center and rotatable along a longitudinal axis of rotation passing through said center of the tool body;

a fluted cutting end and a shank end formed integrally opposite to said fluted cutting end, said fluted cutting end having a nose, a periphery and an end surface extending from said nose to said periphery, said shank end having a shank extending along said longitudinal axis of rotation;

a plurality of flutes extending generally along said end surface in an axial direction of the tool body and located unsymmetrically with each other around said longitudinal axis of rotation so as to be spaced apart from each other, each said flute having a body portion for insertion of a replaceable cutting insert for engaging and cutting a workpiece and forming a circumferencial index with respect to its adjacent flute in a plane perpendicular to said longitudinal axis of rotation, each said cutting insert is secured in said body portion and having a cutting edge that is straight or helically curved and forming a cutting edge geometry whereby each said cutting edge lies on the surface of a circumscribing cylinder defined by the rotation of said cutting edges about said longitudinal axis of rotation of the tool body;

means for securing each said cutting insert in each said body portion;

each said flute having a different helix and a different length when compared to each other, thereby said flutes becoming unsynchronous with each other; and each said flute and said cutting inserts having a rake and a relief.

48. The rotary cutting tool of claim 47 wherein each said flute and said cutting inserts perform the dual function of roughing and finishing.

49. The rotary cutting tool of claim 47 wherein said flutes are spaced angularly apart by unequal circumferencial indexes that together total 360 degrees.

50. The rotary cutting tool of claim 49 wherein each said unequal circumferencial index ranges generally from 10 degrees to 210 degrees.

51. The rotary cutting tool of claim 50 wherein each said unequal circumferencial index ranges from 70 degrees to 110 degrees.

52. The rotary cutting tool of claim 47 wherein each said flute and said cutting inserts are unsymmetrical to each other as said circumferencial indexes vary.

53. The rotary cutting tool of claim 47 wherein each said flute and said cutting inserts are unsymmetrical with each other in respect to said helixes, said rakes, and said reliefs.

54. The rotary cutting tool of claim 47 wherein each said flute and said cutting inserts are unsymmetrical to each other and within themselves as said circumferencial indexes vary.

55. The rotary cutting tool of claim 47 wherein each said flute and said cutting inserts are unsymmetrical with each other and within themselves in respect to said helixes, said rakes, and said reliefs.

56. The rotary cutting tool of claim 52 wherein each said flute and said cutting inserts differ from each other by one-half or more degrees in terms of said circumferencial index.

57. The rotary cutting tool of claim 53 wherein each said flute and said cutting inserts differ from each other by one-half or more degrees in terms of said helixes, said rakes, and said reliefs.

58. The rotary cutting tool of claim 54 wherein each said flute and said cutting inserts differ within themselves and from each other by one-half or more degrees in terms of said circumferencial index.

59. The rotary cutting tool of claim 55 wherein each said flute and said cutting inserts differ within themselves and from each other by one-half or more degrees in terms of said helixes, said rakes, and said reliefs.

60. The rotary cutting tool of claim 47 wherein said rake is a positive or a negative rake, or both.

61. The rotary cutting tool of claim 47 wherein said circumferencial indexes formed by said flutes are unequal and wherein each said flute and said cutting inserts fall within one said index.

62. The rotary cutting tool of claim 47 wherein said flute and said cutting insert geometries create a different sound pattern that substantially reduces resonant harmonic vibrations.

63. The rotary cutting tool of claim 47 wherein said flute and said cutting insert geometries stabilize the tool body at accelerated rotational speeds and at greater depths of cut.

64. The rotary cutting tool of claim 47 wherein the tool body can rotate clockwise or counterclockwise.

65. The rotary cutting tool of claim 47 wherein the tool body is cylindrical, conical or of contoured shape.

66. The rotary cutting tool of claim 47 wherein the tool body is of a roughing or finishing configuration.

67. The rotary cutting tool of claim 47 wherein the workpiece comprises a metal, ferrous or nonferrous.

68. The rotary cutting tool of claim 47 wherein the workpiece comprises an alloy.

69. The rotary cutting tool of claim 47 wherein the workpiece comprises a natural or a synthetic material.

\* \* \* \* \*